US012786251B2

(12) United States Patent
Mirza et al.

(10) Patent No.: US 12,786,251 B2
(45) Date of Patent: Nov. 3, 2026

(54) IMS SESSION CONTINUITY WITH STORED AUTHENTICATION

(71) Applicant: T-Mobile USA, Inc., Bellevue, WA (US)

(72) Inventors: Khurram Ahmad Mirza, Bellevue, WA (US); Madhuri Lakshmi Kotta, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 335 days.

(21) Appl. No.: 18/671,975

(22) Filed: May 22, 2024

(65) Prior Publication Data

US 2025/0365325 A1 Nov. 27, 2025

(51) Int. Cl.

| | |
|---|---|
| ***H04L 65/10*** | (2022.01) |
| ***H04L 65/1016*** | (2022.01) |
| ***H04L 65/1045*** | (2022.01) |
| ***H04L 65/1073*** | (2022.01) |
| ***H04W 12/06*** | (2021.01) |
| ***H04W 60/00*** | (2009.01) |

(52) U.S. Cl.

CPC ...... *H04L 65/1073* (2013.01); *H04L 65/1016* (2013.01); *H04L 65/1045* (2022.05); *H04W 12/06* (2013.01); *H04W 60/00* (2013.01)

(58) Field of Classification Search

CPC ............. H04L 65/1073; H04L 65/1045; H04L 65/1016; H04W 12/06; H04W 60/00

USPC .......................................................... 455/411

See application file for complete search history.

(56) References Cited

U.S. PATENT DOCUMENTS 10,244,004 B2 * 3/2019 Hockey ................. H04L 67/568
2010/0099389 A1 * 4/2010 Zhu ..................... H04L 61/5076 455/414.1
2013/0227663 A1 * 8/2013 Cadenas Gonzalez ..................... H04L 65/1016 726/6

* cited by examiner

*Primary Examiner* — Joel Ajayi
(74) *Attorney, Agent, or Firm* — Foley IP Law, PLLC

(57) ABSTRACT

Solutions are disclosed that provide for internet protocol (IP) multimedia subsystem (IMS) session continuity with stored authentication. When a user equipment (UE) registers with a first proxy call session control function (P-CSCF), the first P-CSCF stores authentication information for the UE, and binding information for an IMS session in an authentication database, for example in a storage area network (SAN). Upon an outage of the first P-CSCF, a second P-CSCF (in the same pool) retrieves the authentication information and binding information in lieu of requiring the UE to register. The second P-CSCF is then able to act as a proxy for the IMS session. This is available for mobile originating (MO) and mobile terminating (MT) calls. For MO calls, the call setup is sped up. For MT calls, the UE is able to receive the call, rather than the call being missed.

17 Claims, 8 Drawing Sheets

IMS SESSION CONTINUITY WITH STORED AUTHENTICATION

BACKGROUND

Modern cellular networks use an internet protocol (IP) multimedia subsystem (IMS) to enable user equipment (UEs) operating on the network to reach data sources, such as media sources, outside the network. Examples include voice calls with UEs operating on other cellular networks, and landline telephones using public switched telephone system (PSTN, also known as plain old telephone system, POTS).

A proxy call session control function (P-CSCF) acts as a proxy for the UE, providing an entry point for the UE to interface with the IMS. The UE needs to register with the P-CSCF in order to access the IMS. However, if the P-CSCF with which the UE is registered experiences an outage, incoming phone calls may be dropped and the UE will miss the incoming calls. A single P-CSCF may host (have registered) more than a million UEs at a time, so an outage of a P-CSCF may have significant consequences for users of the wireless network.

SUMMARY

The following summary is provided to illustrate examples disclosed herein, but is not meant to limit all examples to any particular configuration or sequence of operations.

Solutions are disclosed that provide for internet protocol (IP) multimedia subsystem (IMS) session continuity with stored authentication. Examples perform a registration process for a user equipment (UE) with a first proxy node within an internet protocol (IP) multimedia subsystem (IMS) of a wireless network, to enable the UE to use the first proxy node for an IMS session, wherein performing the registration process comprises: receiving, by the first proxy node, authentication information for the UE and binding information for the UE for an IMS registration period; store the authentication information and the binding information for the UE in a storage location; based on at least detecting that the first proxy node is unavailable, retrieve, by a second proxy node, from the storage location, the authentication information and the binding information for the UE; and provide, by the second proxy node, the IMS session for the UE using the authentication information and the binding information for the UE, and without requiring a registration process for the UE with the second proxy node.

BRIEF DESCRIPTION OF THE DRAWINGS

The disclosed examples are described below with reference to the accompanying drawing figures listed below, wherein.

Figure 1:
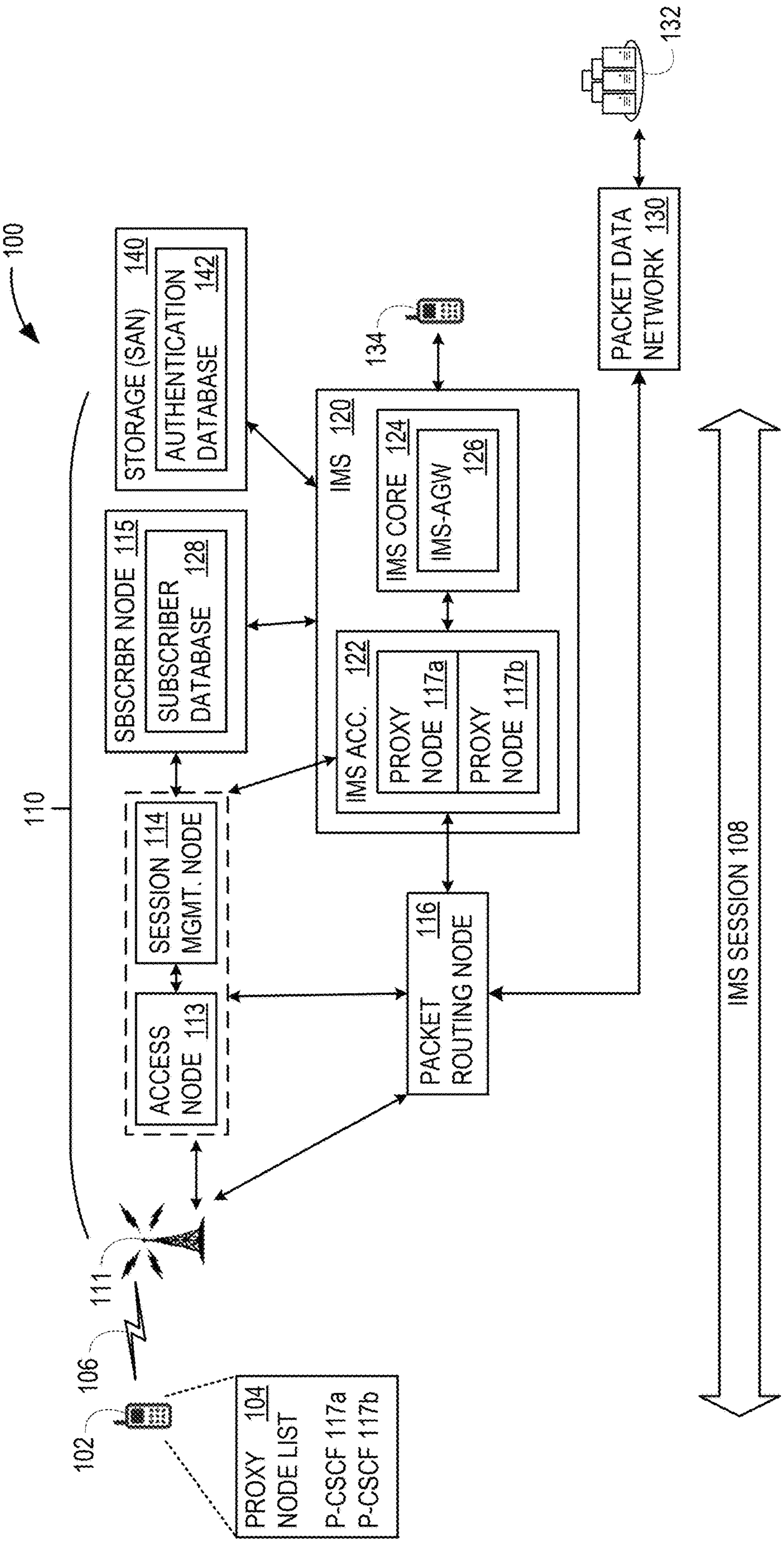
FIG. 1 illustrates an exemplary architecture that advantageously provides for internet protocol (IP) multimedia subsystem (IMS) session continuity with stored authentication.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions are disclosed that provide for internet protocol (IP) multimedia subsystem (IMS) session continuity with stored authentication. When a user equipment (UE) registers with a first proxy call session control function (P-CSCF), the first P-CSCF stores authentication information for the UE, and binding information for an IMS session in an authentication database, for example in a storage area network (SAN). Upon an outage of the first P-CSCF, a second P-CSCF (in the same pool) retrieves the authentication information and binding information in lieu of requiring the UE to register. The second P-CSCF is then able to act as a proxy for the IMS session. This is available for mobile originating (MO) and mobile terminating (MT) calls. For MO calls (initiated by the UE), the call setup is sped up. For MT calls (incoming to the UE), the UE is able to receive the call, rather than the call being missed.

Aspects of the disclosure thus improve the performance of cellular networks by speeding up outgoing calls and preventing missed incoming calls when a P-CSCF is experiencing an outage. These advantageous results are accomplished, at least in part, by storing authentication information and binding information for a UE in a storage location; and based on at least detecting that a first proxy node is unavailable, retrieving, by a second proxy node, from the storage location, the authentication information and the binding information for the UE.

With reference now to the figures, FIG. 1 illustrates an exemplary architecture 100 that advantageously provides for IMS session continuity with stored authentication for a UE 102. UE 102 may be an enhanced Mobile Broadband (eMBB) or cellphone, a fixed wireless access (FWA), internet of things (IoT) device, machine-to-machine (M2M) communication device, a personal computer (PC, e.g., desktop, notebook, tablet, etc.) with a cellular modem, or another telecommunication devices capable of using a wireless network. In the scene depicted in FIG. 1, UE 102 is able to use wireless network 110 for a packet data session to reach a network resource 132 (e.g., a website) across an external packet data network 130 (e.g., the internet). In some scenarios, such as example scenarios described below, UE 102 may use wireless network 110 for a phone call with another UE 134. Wireless network 110 may be a cellular network such as a fifth generation (5G) network, a fourth generation (4G) network, or another cellular generation network.

UE 102 uses an air interface 106 to communicate with a base station 111 of wireless network 110, such that base station 111 is the serving base station for UE 102 (providing the serving cell). In some scenarios, base station 111 may be referred to as a radio access network (RAN). Wireless network 110 has an access node 113, a session management node 114, a subscriber node 115, and other components (not shown). Wireless network 110 also has a packet routing node 116 and at least two proxy nodes, a proxy node 117_a_ and a proxy node 117*b*. Access node 113, session management node 114, and subscriber node 115 are within a control plane of wireless network 110, and packet routing node 116 is within a data plane (a.k.a. user plane) of wireless network 110.

Base station 111 is in communication with access node 113 and packet routing node

116. Access node 113 is in communication with session management node 114, which is in communication with packet routing node 116 and proxy nodes 117*a* and 117*b*. Packet routing node 116 is in communication with proxy nodes 117*a* and 117*b* and packet data network 130. In some 5G examples, base station 111 comprises a gNodeB (gNB), access node 113 comprises an access mobility function (AMF), session management node 114 comprises a session management function (SMF), and packet routing node 116 comprises a user plane function (UPF).

In some 4G examples, base station 111 comprises an eNodeB (eNB), access node 113 comprises a mobility management entity (MME), session management node 114 comprises a system architecture evolution gateway (SAEGW) control plane (SAEGW-C), subscriber node 115 comprises a home subscriber server (HSS), and packet routing node 116 comprises an SAEGW-user plane (SAEGW-U). In some examples, proxy nodes 117*a* and 117*b* each comprises a proxy call session control function (P-CSCF), and subscriber node 115 comprises a home subscriber server (HSS), in both 4G and 5G. In some examples, subscriber node 115 may be considered to be within IMS 120.

In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations. For example, wireless network 110 may use both a gNB and an eNB co-located at a common cell site. In some examples, multiple cells may be co-located at a common cell site, and may be a mix of 5G and 4G.

Proxy nodes 117*a* and 117*b* are each in communication with an IMS access gateway (IMS-AGW) 126 within an IMS core 124 of an IMS 120, in order to provide connectivity to other wireless (cellular) networks, such as for a call with a UE 134 or a public switched telephone system (PSTN, also known as plain old telephone system, POTS). Proxy nodes 117*a* and 117*b* are IMS access nodes within an IMS access portion 122 of IMS 120. UE 102 reaches network resource 132 using packet data network 130 (or IMS 120, in some examples). Data packets of data traffic sent to/from UE 102 pass through at least base station 111 and packet routing node 116 on their way from/to packet data network 130 or IMS-AGW 126. Data packets routed through IMS 120, such as voice data packets for a voice call between UE 102 and UE 134, are part of an IMS session 108.

UE 102 is able to select a proxy node (e.g., one of proxy nodes 117*a* and 117*b*) using a list of proxy nodes 104 that is furnished by wireless network upon UE 102 registering with wireless network 110. Subscriber node 115 has a subscriber database 128, the function of which is described in further detail below. A storage location 140 hosts n authentication database 142, the function of which is also described in further detail below. In some examples, storage location 140 comprises a storage area network (SAN). The SAN may be a physical array of storage or a virtual SAN, and may be distributed in some examples. The operator of wireless network 110 may host SAN within assets of wireless network 110, or access the SAN as a cloud service.

Although FIG. 1 and some of the following figures are described using an example of a cellular network, it should be understood that the teachings herein are applicable to other types of wireless networks. To benefit from the teachings herein, another type of wireless network should have a node that acts as a proxy between a UE and an external network, and requires both authentication information for the UE and binding information for setting up a data session for the UE to reach the external network. With such features, another network other than a cellular network, may benefit from the teachings herein.

Figure 2:
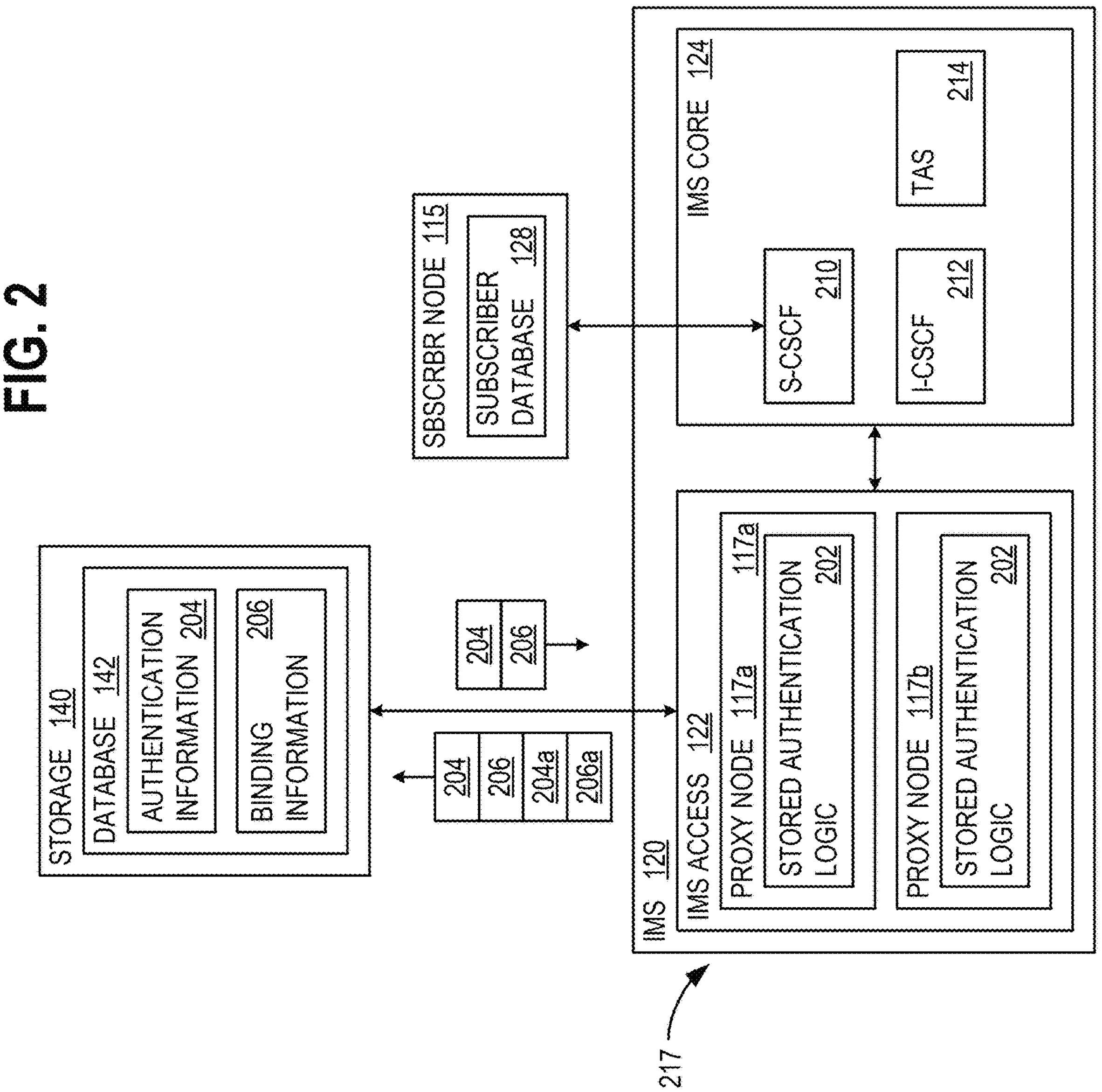
FIG. 2 illustrates further detail for aspects of the architecture of FIG. 1.

FIG. 2 illustrates further detail for aspects of architecture 100. Authentication database 142 in storage location 140 stores authentication information 204 and binding information 206 for UE 102. Authentication information 204 is used to enable a proxy node (e.g., proxy node 117*a* or 117*b*) to trust UE 102. Without this trust, the proxy node will not permit UE 102 to use assets within IMS core 124. Binding information 206 identifies resources used in setting up IMS session 108.

When UE 102 initially registers with proxy node 117*a*, proxy node 117*a* sends authentication information 204 and binding information 206 to storage location 140 for storage in authentication database 142. Upon UE 102 refreshing its registration with proxy node 117*a* (see FIG. 3), proxy node 117*a* sends further authentication information 204*a* (refreshed authentication information 204) and further binding information 206*a* (refreshed binding information 206) to storage location 140 for storage in authentication database 142.

Upon an outage of proxy node 117*a*, when proxy node 117*b* substitutes for proxy node 117*a*, proxy node 117*b* retrieves authentication information 204 and binding information 206 from storage location 140. Proxy node 117*b* uses authentication information 204 to extend trust to UE 102, and uses binding information 206 to set up IMS session 108. In some examples, proxy node 117*a* and proxy node 117*b* are both in a proxy node pool 217.

Proxy node 117*a* and proxy node 117*b* each has a copy of logic 202 that enables proxy nodes 117*a* and 117*b* to transmit and receive authentication information 204 and binding information 206 to/from storage location 140, and use authentication information 204 and binding information 206 to provide IMS session 108 for UE 102. Although examples herein are described for UE 102 registering with proxy node 117*a* and proxy node 117*b* substituting for proxy node 117*a*, it should be understood that the roles of proxy nodes 117*a* and 117*b* may be swapped in some examples.

IMS core 124 has a large number of nodes, although for purposes of the examples disclosed herein, three are shown. A node 210 that may be a serving call session control function (S-CSCF), a node 212 that may be an interrogating call session control function (I-CSCF), and a node 214 that may be a telephony application server (TAS). Any of nodes 210, 212, and 214 has the ability to detect an outage of a proxy node (e.g., via a timeout condition) and query subscriber database 128 within subscriber node 115 to identify a suitable substitute proxy node.

Figure 3:
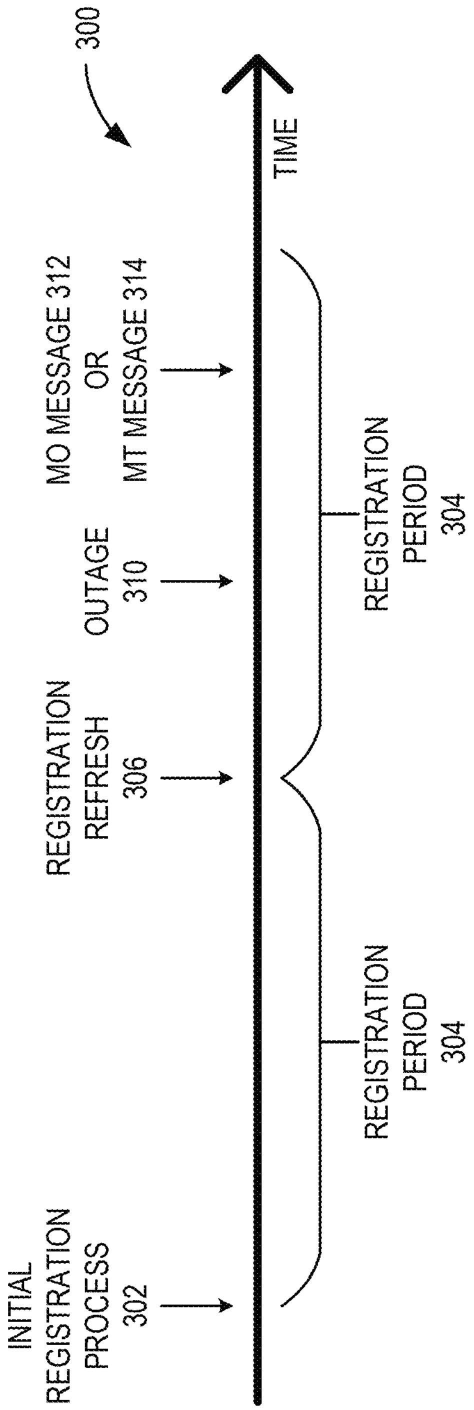
FIG. 3 illustrates an exemplary timeline of events that may occur when using examples of the architecture of FIG. 1.

FIG. 3 illustrates an exemplary timeline 300 of events that may occur when using examples of architecture 100. A registration process 302 registers UE 102 with proxy node 117*a*, so that proxy node 117*a* is ready to provide IMS session 108 to UE, for example for an incoming voice call, an outgoing voice call, or another IMS data session. However, registration process 302 is only valid for a time-limited IMS registration period 304, after which the registration of UE 102 with proxy node 117*a* times out. In some examples, IMS registration period 304 times out after approximately an hour.

A registration refresh 306 resets IMS registration period 304 prior to the expiration, to prevent IMS registration period 304 from timing out. As long as registration refresh 306 recurs on time, IMS registration period 304 remains active. Although only a single registration refresh 306 is illustrated, it should be understood that registration refresh 306 is a period event that recurs as long as UE 102 remains connected to wireless network 110 and does not move a sufficient distance that it needs to register with another proxy node.

An outage 310 of proxy node 117*a* occurs, as shown. An MO message 312 or an MT message 314 is sent to proxy node 117*a* during one of the IMS registration periods 304. However, because of outage 310 proxy node 117*a* is unable to provide IMS session 108 to UE. Example solutions, which enable IMS session 108 to be provided by a substitute proxy node (e.g., proxy node 117*b*), are shown in the remaining FIGS. 4A-6.

Figure 4A:
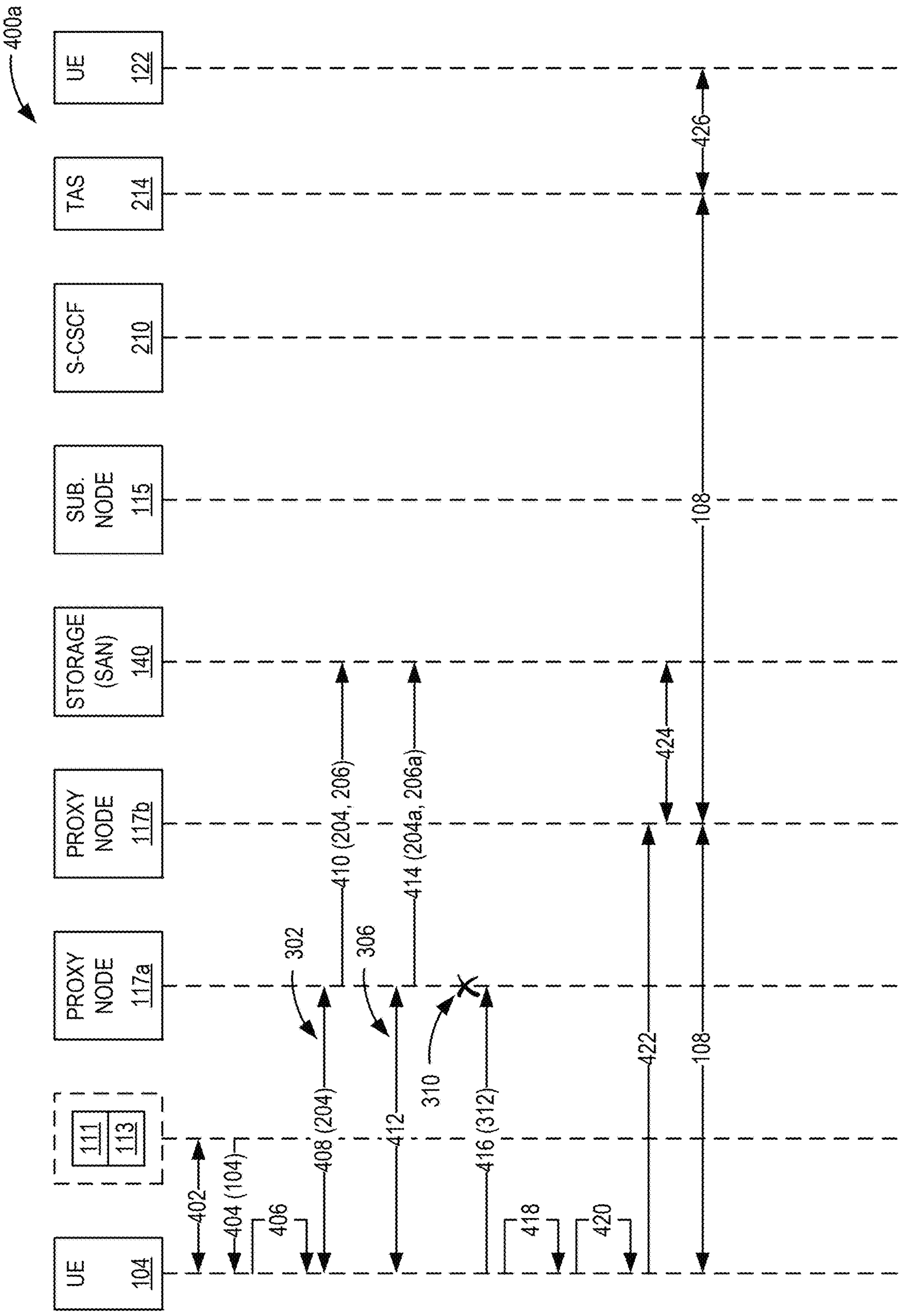
FIGS. 4A and 4B illustrate exemplary message sequence diagrams of messages that may occur in examples of the architecture of FIG. 1.
Figure 4B:
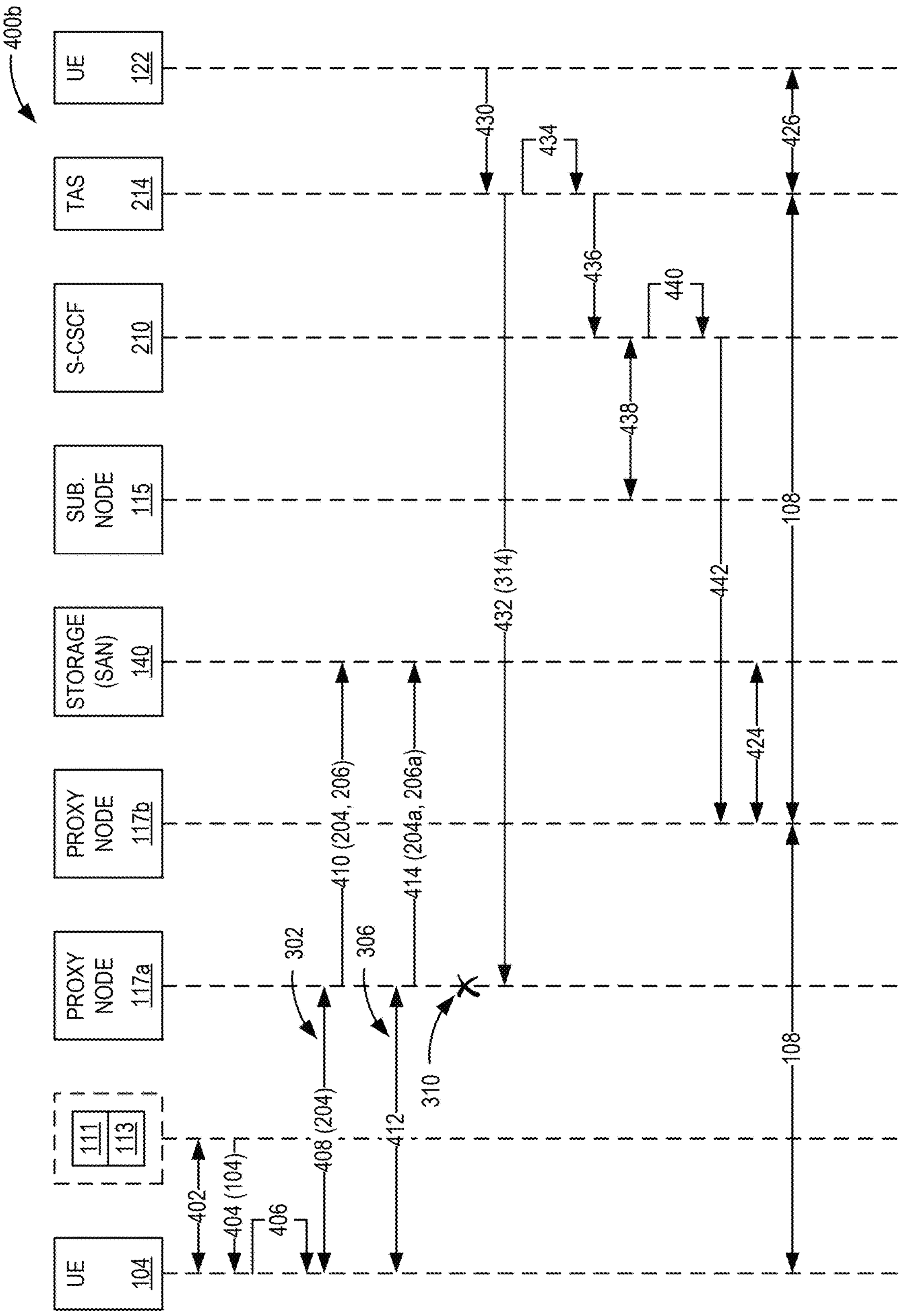
Figure 5:
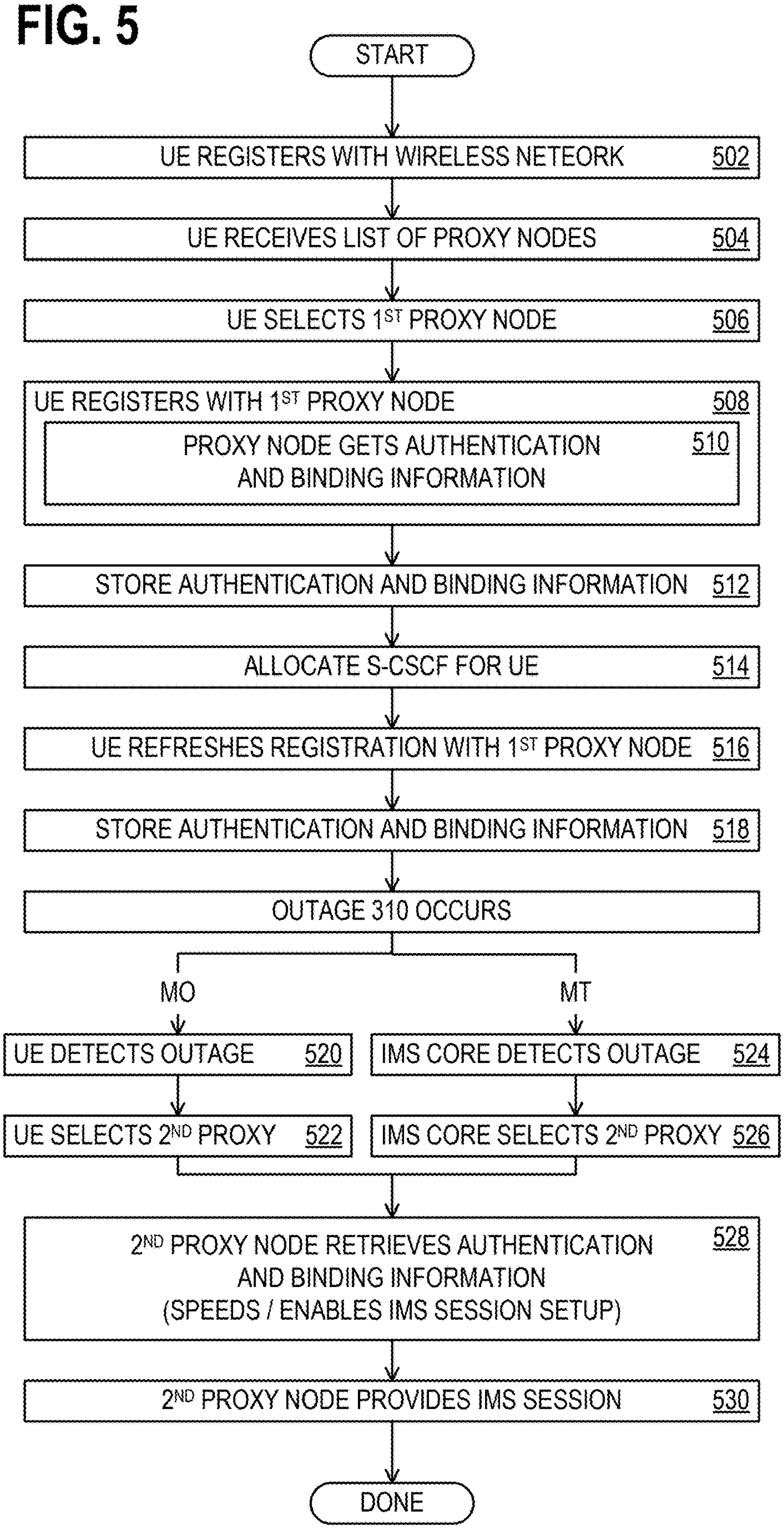
FIGS. 5 and 6 illustrate flowcharts of exemplary operations associated with the architecture of FIG. 1.

FIGS. 4A and 4B illustrate exemplary message sequence diagrams 400*a* and 400*b*, respectively, of messages that may occur in examples of architecture 100. FIG. 5 illustrates a flowchart 500 of exemplary operations associated with architecture 100. In some examples, at least a portion of flowchart 500 may be performed using one or more computing devices 700 of FIG. 7. FIG. 5 will be described along with FIGS. 4A and 4B. Message sequence diagrams 400*a* and 400*b*, of FIGS. 4A and 4B, are identical up through message 414, which corresponds to operation 518 of flowchart 500 of FIG. 5. Thus, reference will be made to flowchart 500 and message sequence diagram 400*a*, until message sequence diagram 400*b* diverges from message sequence diagram 400*a* at operation 524 of flowchart 500 of FIG. 5.

Flowchart 500 commences with UE 102 registering with wireless network 110 in operation 502, using message 402 of message sequence diagram 400*a*. Message 402 represents one or more actual messages between UE 102 and wireless network 110. In some examples, wireless network 110 comprises a cellular network, and UE 102 comprises an eMBB or cellular telephone, or an FWA, or an IoT device. UE 102 receives list of proxy nodes 104, which includes proxy node 117*a* and proxy node 117*b*, from wireless network 110, in operation 504, using message 404. In some examples, proxy node 117*a* and proxy node 117*b* each comprises an IMS access node, such as a P-CSCF, and proxy node 117*a* and proxy node 117*b* are in a common proxy node pool (e.g., proxy node pool 217).

UE 102 selects proxy node 117*a* from list of proxy nodes 104 in operation 506, which is also shown as decision 406 in message sequence diagram 400*a*. In operation 508, UE 102 performs registration process 302 (see FIG. 3) with proxy node 117*a*, using message 408, to enable UE 102 to later use proxy node 117*a* for IMS session 108 during IMS registration period 304. Message 408 represents one or more actual messages between UE 102 and proxy node 117*a*. Operation 508 includes operation 510, in which proxy node 117*a* receives authentication information 204 for UE 102 (from UE 102 in message 408) and obtains binding information 206 to use for IMS session 108.

Based on at least registration process 302 for UE 102 with proxy node 117*a* being successful, proxy node 117*a* stores authentication information 204 and binding information 206 for UE 102 in storage location 140, using message 410, in operation 512. In some examples, authentication information 204 and binding information 206 are stored in authentication database 142, and/or, storage location 140 comprises a SAN. In operation 514, wireless network 110 allocates node 210 as the S-CSCF to support to UE 102 for IMS activity.

Registration refresh 306 is a periodic event (e.g., approximately hourly, in some examples), to reset IMS registration period 304, and so proxy node 117*a* receives further authentication information 204*a*, using message 412, and so receives further binding information 206*a*, in operation 516, as part of registration refresh 306. Based on at least registration refresh 306 being successful, proxy node 117*a* stores further authentication information 204*a* and authentication information 204 and stores further binding information 206*a* as binding information 206 in storage location 140, using message 414, in operation 518.

Proxy node 117*a* then experiences outage 310, which will prevent it from being used by UE 102 for IMS session 108. Flowchart 500 shows two branches, based on whether MO message 312 or MT message 314 occurs first after outage 310. For MO message 312, flowchart 500 passes through operations 520 and 522, and uses messages of message sequence diagram 400*a*. For MT message 314, flowchart 500 passes through operations 524 and 526, and uses messages of message sequence diagram 400*b* of FIG. 4B.

Referring first to the MO message 312 branch, UE 102 attempts to initiate IMS session 108 using MO message 312 (shown as message 416 in message sequence diagram 400*a*) in operation 520 of flowchart 500. In some examples, this is an attempt by UE 102 to place a voice call to UE 134. However, because proxy node 117*a* is experiencing outage 310, the connection attempt times out, and UE 102 detects that proxy node 117*a* is unavailable in decision 418. Based on at least detecting that proxy node 117*a* is unavailable, UE 102 selects proxy node 117*b* from list of proxy nodes 104 in operation 522, which is shown as decision 420. UE 102 then messages proxy node 117*b* using message 422, to set up IMS session 108.

Referring now to the MT message 314 branch, as part of operation 524, UE 134 attempts to place a voice call to UE 102, which is show as message 430 in message sequence diagram 400*b* of FIG. 4B. This results in MT message 314 toward proxy node 117*a*, shown as message 432 from node 214 (a TAS) to proxy node 117*a*. However, because proxy node 117*a* is experiencing outage 310, the connection attempt times out, and node 214 detects that proxy node 117*a* is unavailable in decision 434. In some examples, node 210 or node 212 or another node in IMS core 124 detects that proxy node 117*a* is unavailable. The node that detects that proxy node 117*a* is unavailable alerts node 210 (e.g., an S-CSCF allocated to UE 102) using message 436.

In operation 526, node 210 pulls a list of proxy nodes available for UE 102 to use from subscriber database 128 of subscriber node 115 using message 438. Message 438 represents one or more actual messages between node 210 and subscriber node 115. Node 210 selects proxy node 117*b* using the information retrieved from subscriber node 115, which is shown as decision 440. Node 210 then messages proxy node 117*b* using message 442, to set up IMS session 108. Message sequence diagram 400*b* of FIG. 4B returns to following message sequence diagram 400*a* of FIG. 4A for the remainder of the respective diagrams and operations of flowchart 500.

In operation 528, based on at least detecting that proxy node 117*a* is unavailable (by UE 102 or a node in IMS core 124), proxy node 117*b* retrieves authentication information 204 for UE 102 and binding information 206 for UE 102 to use for IMS session 108, from storage location 140. This is shown as message 424 in both message sequence diagram 400*a* and message sequence diagram 400*b*. Message 424 represents one or more actual messages between proxy node 117*b* and storage location 140. By retrieving authentication information 204 and binding information 206 for UE 102 from storage location 140, UE 102 does not miss the incoming call from UE 134, and the need for UE 102 to perform a registration process with proxy node 117*b* (prior to receiving the call from UE 134) is precluded). This advantageously enables and/or speeds up setting up IMS session 108.

Proxy node 117*b* provides IMS session 108 for UE 102 using authentication information 204 and binding information 206 in operation 530, without first requiring a registration process for UE 102 with proxy node 117*b*. The phone call with UE 134 is shown as message 426 in both message sequence diagram 400*a* and message sequence diagram 400*b*. In some examples, IMS session 108 comprises MO message 312 (e.g., a voice call to UE 134) or MT message 314 (e.g., a voice call from UE 134).

Figure 6:
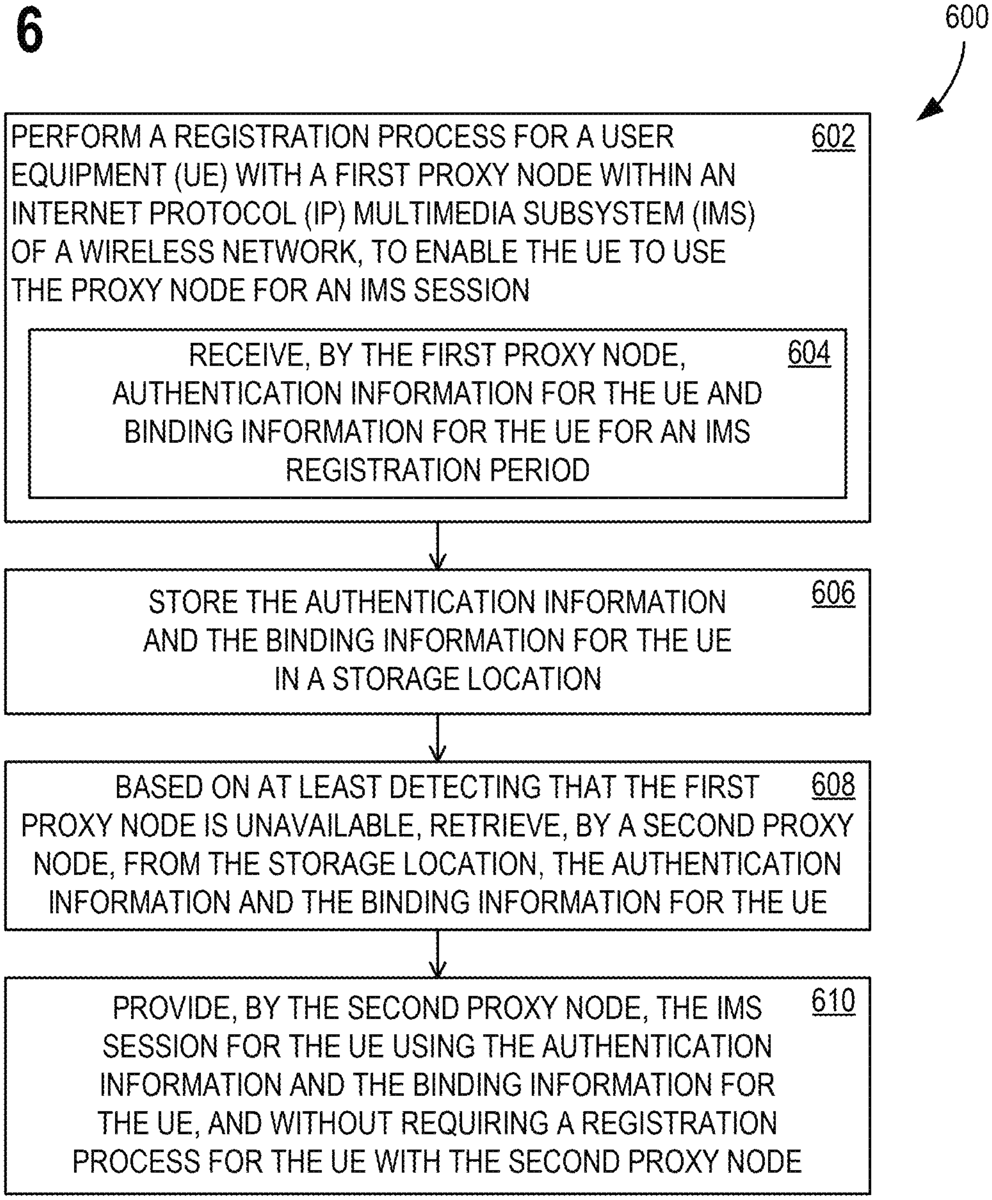

FIG. 6 illustrates a flowchart 600 of exemplary operations associated with examples of architecture 100. In some examples, at least a portion of flowchart 600 may be performed using one or more computing devices 700 of FIG. 7. Flowchart 600 commences with operation 602, which includes performing a registration process for a UE with a first proxy node within an IMS of a wireless network, to enable the UE to use the first proxy node for an IMS session. Operation 602 is performed using operation 604, which includes receiving, by the first proxy node, authentication information for the UE and binding information for the UE for an IMS registration period.

Operation 606 includes storing the authentication information and the binding information for the UE in a storage location. Operation 608 includes, based on at least detecting that the first proxy node is unavailable, retrieving, by a second proxy node, from the storage location, the authentication information and the binding information for the UE. Operation 610 includes providing, by the second proxy node, the IMS session for the UE using the authentication information and the binding information for the UE, and without requiring a registration process for the UE with the second proxy node.

Figure 7:
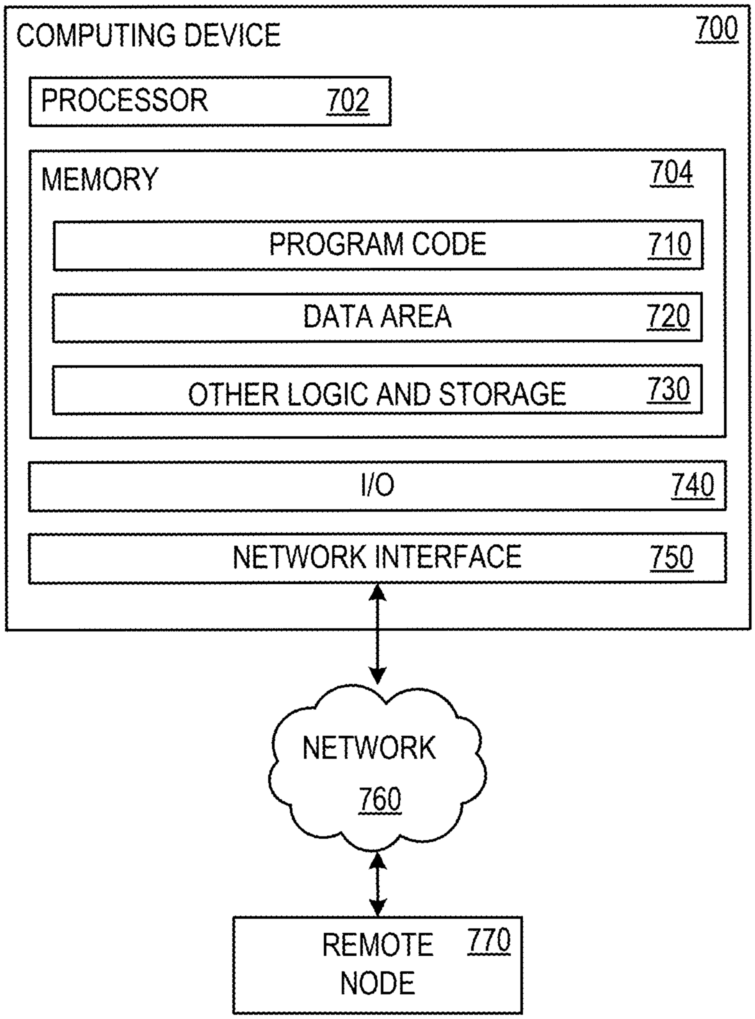
FIG. 7 illustrates a block diagram of a computing device suitable for implementing various aspects of the disclosure.

FIG. 7 illustrates a block diagram of computing device 700 that may be used as any component described herein that may require computational or storage capacity. Computing device 700 has at least a processor 702 and a memory 704 that holds program code 710, data area 720, and other logic and storage 730. Memory 704 is any device allowing information, such as computer executable instructions and/or other data, to be stored and retrieved. For example, memory 704 may include one or more random access memory (RAM) modules, flash memory modules, hard disks, solid-state disks, persistent memory devices, and/or optical disks. Program code 710 comprises computer executable instructions and computer executable components including instructions used to perform operations described herein. Data area 720 holds data used to perform operations described herein. Memory 704 also includes other logic and storage 730 that performs or facilitates other functions disclosed herein or otherwise required of computing device 700. An input/output (I/O) component 740 facilitates receiving input from users and other devices and generating displays for users and outputs for other devices. A network interface 750 permits communication over external network 760 with a remote node 770, which may represent another implementation of computing device 700. For example, a remote node 770 may represent another of the above-noted nodes within architecture 100.

Additional Examples

An example system comprises: a processor; and a computer-readable medium storing instructions that are operative upon execution by the processor to: perform a registration process for a UE with a first proxy node within an IMS of a wireless network, to enable the UE to use the first proxy node for an IMS session, wherein performing the registration process comprises: receiving, by the first proxy node, authentication information for the UE and binding information for the UE for an IMS registration period; store the authentication information and the binding information for the UE in a storage location; based on at least detecting that the first proxy node is unavailable, retrieve, by a second proxy node, from the storage location, the authentication information and the binding information for the UE; and provide, by the second proxy node, the IMS session for the UE using the authentication information and the binding information for the UE, and without requiring a registration process for the UE with the second proxy node.

An example method of wireless communication comprises: performing a registration process for a UE with a first proxy node within an IMS of a wireless network, to enable the UE to use the first proxy node for an IMS session, wherein performing the registration process comprises: receiving, by the first proxy node, authentication information for the UE and binding information for the UE for an IMS registration period; storing the authentication information and the binding information for the UE in a storage location; based on at least detecting that the first proxy node is unavailable, retrieving, by a second proxy node, from the storage location, the authentication information and the binding information for the UE; and providing, by the second proxy node, the IMS session for the UE using the authentication information and the binding information for the UE, and without requiring a registration process for the UE with the second proxy node.

One or more example computer storage devices has computer-executable instructions stored thereon, which, upon execution by a computer, cause the computer to perform operations comprising: performing a registration process for a UE with a first proxy node within an IMS of a wireless network, to enable the UE to use the first proxy node for an IMS session, wherein performing the registration process comprises: receiving, by the first proxy node, authentication information for the UE and binding information for the UE for an IMS registration period; storing the authentication information and the binding information for the UE in a storage location; based on at least detecting that the first proxy node is unavailable, retrieving, by a second proxy node, from the storage location, the authentication information and the binding information for the UE; and providing, by the second proxy node, the IMS session for the UE using the authentication information and the binding information for the UE, and without requiring a registration process for the UE with the second proxy node.

Alternatively, or in addition to the other examples described herein, examples include any combination of the following:

- the wireless network comprises a cellular network;
- the UE comprises an eMBB or cellular telephone, or an FWA;

receiving, by the first proxy node, further authentication information for the UE and further binding information for the IMS session as part of a registration refresh;
the registration refresh resets the IMS registration period;
storing the further authentication information and the further binding information in the storage location as the authentication information and the binding information;
the first proxy node and the second proxy node each comprises a P-CSCF;
the IMS session comprises an MO message;
the UE detects that the first proxy node is unavailable;
based on at least detecting that the first proxy node is unavailable, selecting, by the UE, the second proxy node;
the IMS session comprises an MT message;
a node within an IMS core of the IMS detects that the first proxy node is unavailable;
based on at least detecting that the first proxy node is unavailable, selecting, by a second node within the IMS, the second proxy node;
the second node within the IMS comprises an S-CSCF;
the node within the IMS core that detects the first proxy node is unavailable is the second node within the IMS;
the node within the IMS core that detects the first proxy node is unavailable is a TAS;
the node within the IMS core that detects the first proxy node is unavailable is an I-CSCF;
the storage location comprises a SAN;
the first proxy node and the second proxy node each comprises an IMS access node;
receiving, by the UE, a list of proxy nodes, the list of proxy nodes including the first proxy node and the second proxy node;
allocating the second node within the IMS to the UE for the IMS session;
the second node within the IMS is within the IMS core;
selecting, by the UE, the first proxy node from the list of proxy nodes;
based on at least detecting that the first proxy node is unavailable, selecting, by the UE, the second proxy node from the list of proxy nodes;
the authentication information for the UE is received within one or more registration messages;
storing the authentication information and the binding information for the UE in a storage location is based on at least the registration process for the UE with the first proxy node being successful;
the registration refresh is a periodic event;
the registration refresh recurs approximately hourly;
storing the authentication information and the binding information for the UE in an authorization database in the storage location;
retrieving the authentication information and the binding information for the UE from the database in the storage location;
the first proxy node and the second proxy node are in a common proxy node pool;
retrieving, by the second proxy node, the authentication information and the binding information for the UE precludes a need for a registration process for the UE with the second proxy node;
IMS session comprises a voice call;
the second node within the IMS selects the second proxy node using a subscriber database of the wireless network; and
the subscriber database is stored on an HSS.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:
performing a registration process for a user equipment (UE) with a first proxy call session control function (P-CSCF) within an internet protocol (IP) multimedia subsystem (IMS) of a wireless network, to enable the UE to use the first P-CSCF for an IMS session, wherein performing the registration process comprises:
receiving, by the first P-CSCF, from the UE, authentication information for the UE and binding information for the UE for an IMS registration period;
storing, by the first P-CSCF, the authentication information and the binding information for the UE in a network storage location;
receiving, by the first P-CSCF, from the UE. further authentication information for the UE and further binding information for the IMS session as part of a periodic registration refresh, wherein the registration refresh resets the IMS registration period;
storing, by the first P-CSCF, the further authentication information and the further binding information in the network storage location as the authentication information and the binding information;
based on at least detecting, by an IP multimedia subsystem (IMS) node, that the first P-CSCF is unavailable, retrieving, by a second P-CSCF, from the network storage location, the authentication information and the binding information for the UE; and
providing, by the second P-CSCF, the IMS session for the UE using the authentication information and the binding information for the UE, and without requiring a registration process for the UE with the second P-CSCF.

2. The method of claim 1, wherein the first proxy node and the second proxy node each comprises a proxy call session control function (P-CSCF).

3. The method of claim 1, wherein the IMS session comprises a mobile originated (MO) message, wherein the UE detects that the first proxy node is unavailable, and wherein the method further comprises:

based on at least detecting that the first proxy node is unavailable, selecting, by the UE, the second proxy node.

4. The method of claim 1, wherein the IMS session comprises a mobile terminated (MT) message, wherein a node within an IMS core of the IMS detects that the first proxy node is unavailable, and wherein the method further comprises:

based on at least detecting that the first proxy node is unavailable, selecting, by a second node within the IMS, the second proxy node.

5. The method of claim 4, wherein the second node within the IMS comprises a serving call session control function (S-CSCF).

6. The method of claim 4, wherein the node within the IMS core that detects the first proxy node is unavailable is the second node within the IMS or a telephony application server (TAS) or an interrogating call session control function (I-CSCF).

7. A system comprising:

an internet protocol (IP) multimedia subsystem (IMS) of a wireless network;

a first proxy call session control function (P-CSCF);

a second P-CSCF; and a user equipment (UE);

wherein the first P-CSCF performs a registration process for a UE to enable the UE to use the first P-CSCF for an IMS session, wherein performing the registration process comprises:

receiving, by the first P-CSCF, from the UE, authentication information for the UE and binding information for the UE for an IMS registration period;

storing, by the first P-CSCF, the authentication information and the binding information for the UE in a network storage location;

receiving, by the first P-CSCF, from the UE, further authentication information for the UE and further binding information for the IMS session as part of a periodic registration refresh, wherein the registration refresh resets the IMS registration period;

storing, by the first P-CSCF, the further authentication information and the further binding information in the network storage location as the authentication information and the binding information;

wherein based on at least detecting, by an IP multimedia subsystem (IMS) node, that the first P-CSCF is unavailable, retrieve, by a second P-CSCF, from the network storage location, the authentication information and the binding information for the UE; and provide, by the second P-CSCF, the IMS session for the UE using the authentication information and the binding information for the UE, and without requiring a registration process for the UE with the second P-CSCF.

8. The system of claim 7, wherein the first proxy node and the second proxy node each comprises a proxy call session control function (P-CSCF).

9. The system of claim 7, wherein the IMS session comprises a mobile originated (MO) message, wherein the UE detects that the first proxy node is unavailable, and wherein the instructions are further operative to:

based on at least detecting that the first proxy node is unavailable, select, by the UE, the second proxy node.

10. The system of claim 7, wherein the IMS session comprises a mobile terminated (MT) message, wherein a node within an IMS core of the IMS detects that the first proxy node is unavailable, and wherein the instructions are further operative to:

based on at least detecting that the first proxy node is unavailable, select, by a second node within the IMS, the second proxy node.

11. The system of claim 10, wherein the second node within the IMS comprises a serving call session control function (S-CSCF).

12. The system of claim 10, wherein the node within the IMS core that detects the first proxy node is unavailable is the second node within the IMS or a telephony application server (TAS) or an interrogating call session control function (I-CSCF).

13. One or more computer storage devices having computer-executable instructions stored thereon, which, upon execution by a computer, cause the computer to perform operations comprising:

performing a registration process for a user equipment (UE) with a first proxy call session control function (P-CSCF) within an internet protocol (IP) multimedia subsystem (IMS) of a wireless network, to enable the UE to use the first P-CSCF for an IMS session, wherein performing the registration process comprises:

receiving, by the first P-CSCF, from the UE, authentication information for the UE and binding information for the UE for an IMS registration period;

storing, by the first P-CSCF, the authentication information and the binding information for the UE in a network storage location;

receiving, by the first P-CSCF, from the UE, further authentication information for the UE and further binding information for the IMS session as part of a periodic registration refresh, wherein the registration refresh resets the IMS registration period;

storing, by the first P-CSCF, the further authentication information and the further binding information in the network storage location as the authentication information and the binding information;

based on at least detecting, by an IP multimedia subsystem (IMS) node, that the first P-CSCF is unavailable, retrieving, by a second P-CSCF, from the network storage location, the authentication information and the binding information for the UE; and providing, by the second P-CSCF, the IMS session for the UE using the authentication information and the binding information for the UE, and without requiring a registration process for the UE with the second P-CSCF.

14. The one or more computer storage devices of claim 13, wherein the first proxy node and the second proxy node each comprises a proxy call session control function (P-CSCF).

15. The one or more computer storage devices of claim 13, wherein the IMS session comprises a mobile originated (MO) message, wherein the UE detects that the first proxy node is unavailable, and wherein the operations further comprise:

based on at least detecting that the first proxy node is unavailable, selecting, by the UE, the second proxy node.

16. The one or more computer storage devices of claim 13, wherein the IMS session comprises a mobile terminated (MT) message, wherein a node within an IMS core of the IMS detects that the first proxy node is unavailable, and wherein the operations further comprise:

based on at least detecting that the first proxy node is unavailable, selecting, by a second node within the IMS, the second proxy node.

17. The one or more computer storage devices of claim 16, wherein the second node within the IMS comprises a serving call session control function (S-CSCF), and wherein the node within the IMS core that detects the first proxy node is unavailable is the second node within the IMS or a telephony application server (TAS) or an interrogating call session control function (I-CSCF).

* * * * *